United States Patent [19]
Khan

[11] Patent Number: 5,077,929
[45] Date of Patent: Jan. 7, 1992

[54] SELF-PROPELLED FISHING DEVICE

[76] Inventor: Asad A. Khan, 20601 Hartland St. #4, Canoga Park, Calif. 91306

[21] Appl. No.: 733,847

[22] Filed: Jul. 22, 1991

[51] Int. Cl.[5] .............................................. A01K 89/00
[52] U.S. Cl. ...................................... 43/26.1; 446/154
[58] Field of Search ............... 43/26.1, 26.2; 446/154, 446/160, 161, 162, 163, 164, 165

[56] References Cited

U.S. PATENT DOCUMENTS

| | | | |
|---|---|---|---|
| 3,007,432 | 11/1961 | Still | 43/26.1 |
| 3,203,131 | 8/1965 | Myers | 43/26.1 |
| 3,793,761 | 2/1974 | Bonham | 43/26.1 |
| 4,757,633 | 7/1988 | Van Cleve | 43/26.1 |

FOREIGN PATENT DOCUMENTS 0466942  2/1969  Switzerland .......................... 43/26.1

Primary Examiner—Richard K. Seidel
Assistant Examiner—James Miner
Attorney, Agent, or Firm—Gilbert Kivenson

[57] ABSTRACT

A self-propelled fishing device is described which can be used to tow a fishing line away from shore or from a stationary fishing boat. The device may be used to carry lures or baited hooks. It can be made to turn, submerge or move to a desired position and stop by a series of tugs on the fishing line. It can be reeled in or guided along a return path.

3 Claims, 2 Drawing Sheets

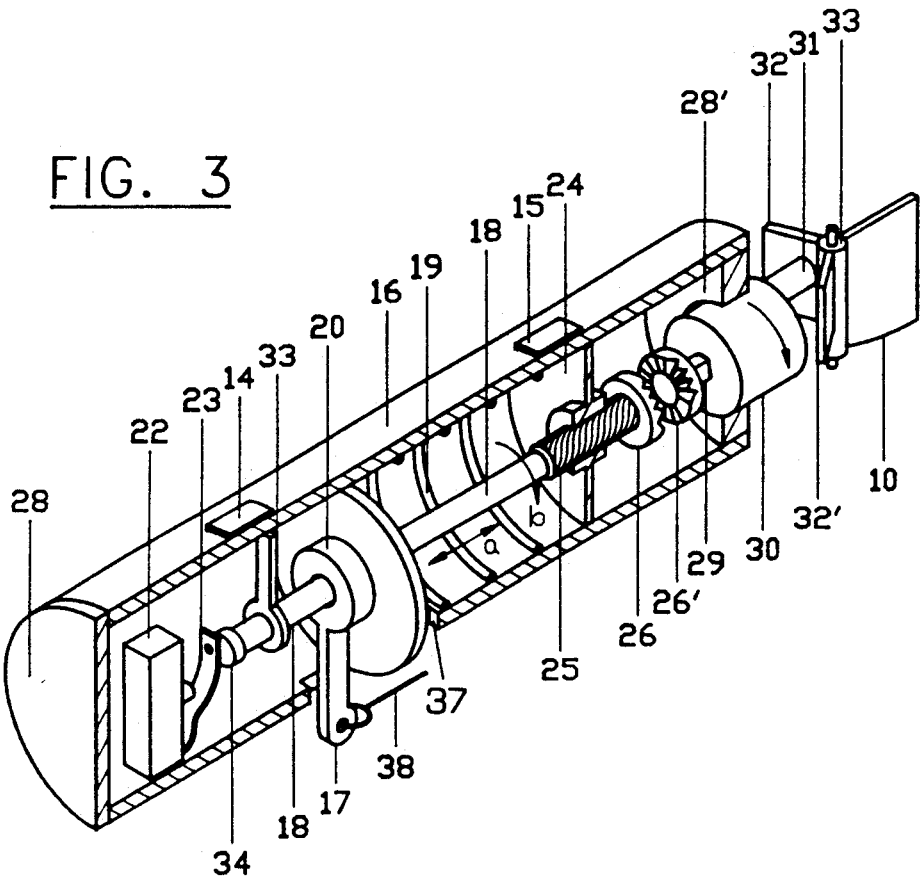
FIG. 3
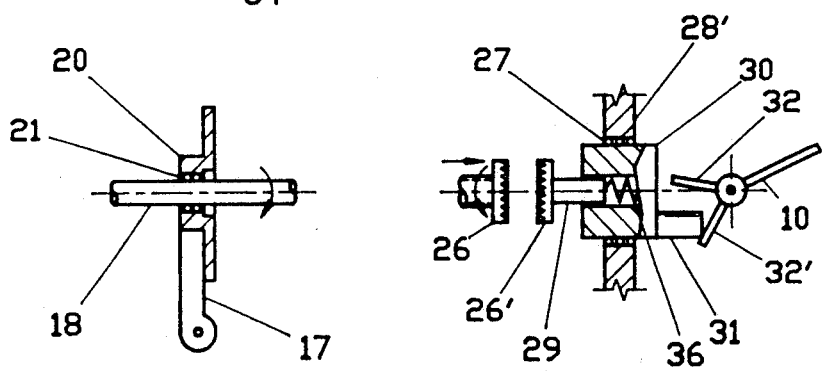
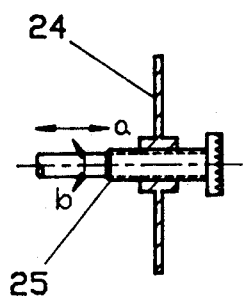
FIG. 7
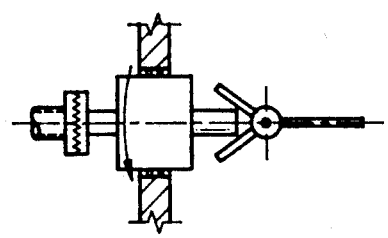
FIG. 4
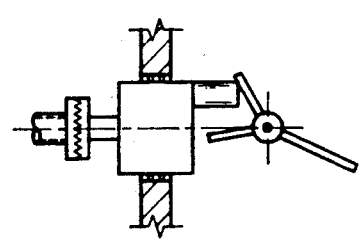
FIG. 5
FIG. 8
FIG. 6

SELF-PROPELLED FISHING DEVICE

BACKGROUND OF THE INVENTION

The present invention relates to a fishing device which is used to tow a fishing line away from shore or from a stationary boat and carries suitably baited hooks to various positions in the water. The device is driven by an electric motor and propeller. The starting and stopping of the motor, the direction and the depth of operation is controlled by tugs on the fishing line. The invention enables the angler to position a baited hook or lure at various points on and in the water where he suspects the presence of fish without his acquiring the considerable casting skill required to do this with conventional fishing gear alone.

A number of battery-operated, guidable fishing aids appear in the prior art. Curtis, for example, (U.S. Pat. No. 3,758,975) utilizes a relatively coarse steering means to adjust the direction in which a pear-shaped, propeller-driven bobber moves. The shape of the vessel makes for poor steerability and low drive efficiency from the battery-motor combination. The line-controllable boat of Holling (U.S. Pat. No. 3,739,516) provides for the turning of a rudder by means of a line operated loop of wire which is attached to the rudder post. This arrangement is operable but requires considerable manipulative skill on the part of the angler. The troller of Jackson (U.S. Pat. No. 2,804,712) uses a fishing-line-operated switch to start stop and reverse an electric motor drive so that the troller can be made to retrace its original path and return to its starting point. The fisherman however needs to manipulate the line horizontally as well as vertically inorder to drive the switch into various modes. No rudder is provided. The fishing line towing device of Lumsden (U.S. Pat. No. 2,693,047) utilizes two lines—a control line and the fishing line—to manipulate the device.

OBJECTIVES OF THE PRESENT INVENTION

It is a first objective of the invention to provide a self-propelled fishing device which can travel on the surface of a body of water, submerge to a desired depth or to continuously change depths inorder to operate at levels where the most fish can be lured under the conditions present on a particular day.

It is a second objective of the present invention to provide a control system permitting the device to be turned in any direction by a series of simple tugs on the fishing line.

It is a third objective of the present invention to provide a simple system by which the device can be submerged to a desired depth.

The means for carrying out these and other objectives will be shown in the Description of the Invention section below and with references to FIGS. 1 through 8.

DESCRIPTION OF THE FIGURES

FIG. 3 is a cut-away perspective of the control assembly which is attached to the underside of the invention as shown in FIG.1.

FIG. 4 is a partial, top view of the rudder drive mechanism in the control assembly with the rudder deflected to the right.

FIG. 5 is a partial, top view of the rudder drive mechanism with the rudder in a neutral position.

FIG. 6 is a partial, top view of the rudder drive mechanism with the rudder deflected to the left.

FIG. 7 is a partial, expanded view of the actuator lever which is part of the control assembly.

FIG. 8 is a partial, expanded view of the clutch drive which is another part of the control assembly.

DESCRIPTION OF THE INVENTION

Figure 1:
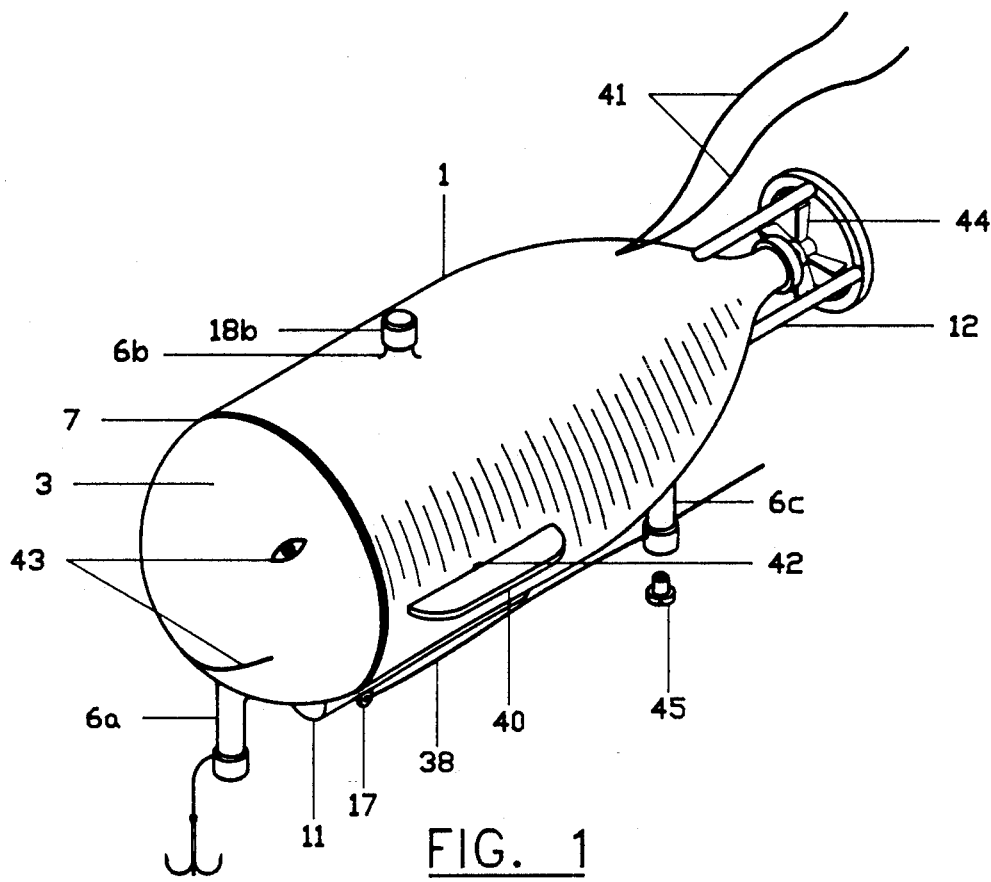
FIG. 1 is an isometric view of the invention.

The present invention will be described with reference to FIGS. 1-8. The general shape and features of the device can be seen in the perspective of FIG. 1 and in the cross section of FIG. 2. The outer shell is submarine shaped and consists of a main body 1, a detachable nosepiece 3, a propeller 44, a propeller guard 12, a control assembly 11, threaded projections 6a, 6b, and 6c and a rudder 10. Nosepiece 3 is threaded at its periphery to fit a threaded portion in the main body. A flexible "O" ring 7 is used to seal the interior of the main body against water. An internal extension 5 of the nosepiece (FIG. 2) is provided with a resilient end 39 which bears against the pivoted contact arm 40 and forces it against the central post of a battery 4 when the nosepiece is tightened. Battery 4 is connected to a motor 2 which drives shaft 9 and the propellor 44 through shaft seal 8 as is known in the art. The motor is connected to the battery by wires 35 and the lever-actuated, miniature switch 22 which is located in the control assembly 11.

A fishing line 38 is passed through hole 16c and is tied to the actuation link 17. This arrangement represents only one of several possibilities. The fishing line can be directly tied to link 17 and hole 16c used for additional fishing hooks or to tow an external lure-and-hook combination.

Projections 6a and 6c are threaded on their ends to accommodate internally threaded sinkers when extra weight is required for sub-surface fishing techniques or to stabilize the invention in strong currents. Projection 6b is similiarly threaded and can be used to fasten an internally threaded float to increase buoyancy when required.

With reference now to the cut-away perspective view of the control assembly in FIG. 3, the control elements of the fishing device are housed in the cylindrical chamber 16 which is terminated on its ends by the walls 28 and 28'. Chamber 16 is attached to main body 1 at points 14 and 15.

Control shaft 18 is mounted near one end in hanger 33 so as to allow translational and rotational freedom. At its other end control shaft 18 contains the threaded section 25 which is engaged in a threaded aperture in the bulkhead 24. Control shaft 18 terminates in saw-toothed clutch member 26. The mating member 26' of the saw-toothed clutch is attached to rectangular pin 29 which slides into a rectangular recess and bears against the spring 36 as is shown in FIG. 4. The rectangular recess is formed in the spindle 30 which is mounted in bearing 27 to give rotational but not translational freedom. Spindle 30 terminates in the eccentrically mounted rod 31 which, depending on the angular position of spindle 30 may be in contact with flap 32, 32' or in the space between them. Flaps 32 and 32' are mounted on rudder post 33 which also carries rudder 10.

Actuation link 17 connects through coupling 20 (FIGS. 3 and 7) to control shaft 18 through bearing 21 which permits rotation but not translation. Link 17 communicates with the outside of chamber 16 through slit 37. Coupling 20 is enlarged at its rear-facing end so as to engage compression spring 19. When fishing line 38 is given a quick tug, actuation link 17 acts through coupling 20 to compress spring 19 and to move control shaft 18 towards the rear of the control assembly housing. After the tug is relaxed, the control shaft is forced forward by expansion of spring 19 past its original rest position so that a button 34 activates lever 23 of the miniature switch 22. The elasticity of lever 23 then causes shaft 18 to rebound to its equilibrium position.

The threaded section 25 on the control shaft 18 is cut with a pitch angle greater than 45 degrees so that axial motion (a in FIG. 8) will cause the shaft to turn (b in FIG. 8). This turning is transmitted by the saw-toothed clutch members 26 and 26' when the axial motion of shaft 18 causes the two members to engage. The spindle 30 thus turns whenever shaft 18 is actuated by means of a quick tug. A series of tugs will move spindle 30 through one or more complete revolutions. Rod 31, by its contact with flaps 32 and 32', will cause rudder 10 to assume a starboard orientation, a return to neutral, a port orientation, and another return to neutral, etc. as illustrated in FIGS. 4, 5 and 6.

Miniature switch 22 is a single pole, single throw type. Drive motor 2 is alternately stopped and started with each sharp tug on the fishing line. It is thus possible to control the movement and direction of the fishing device from on shore or from a boat by the number of tugs used by the angler. The device can be set to circle continuously in either direction, to straighten out and head for deeper or shallower water or to stop at various locations.

Adjustable diving planes 40, shown in FIG. 1, can be set so that the device will descend while the motor is on and float back to the surface when the motor is stopped. Weights may be threaded onto extensions 6a and 6c to achieve a neutral buoyancy so that the invention can be operated submerged for close-to-bottom fishing. For submerged operation a light-weight mast can be attached to extension 6b to enable the fisherman to keep track of the device's position.

Other features used in the prior art such as the painted on faces of sea life 43 and the wigglers 41 (FIG. 1) may be added to enhance the luring capability of the present invention.

Figure 2:
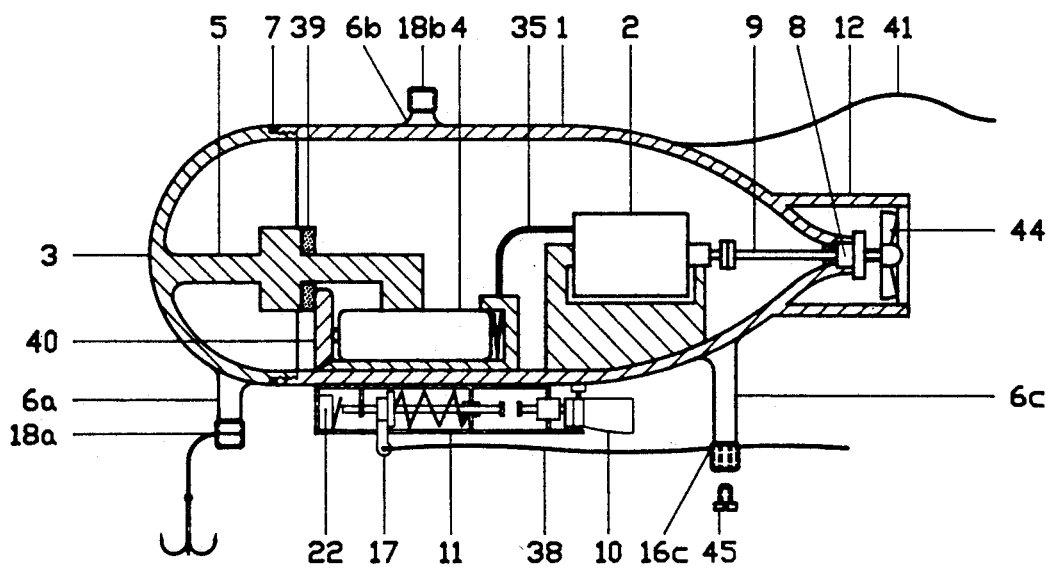
FIG. 2 is a lateral cross sectional view of the invention.

An additional method of operation is facilitated by the use of bolt 45 which threads into the bottom of projection 6c and locks the fishing line 38 (FIG. 2). This immobilizes actuator link 17. The switch 22 must be on and the rudder in a neutral position before bolt 45 is tightened. With the fishing line in a slack position the device will now proceed in a forward direction along the surface of the water. If the fishing line is now tugged upwardly, the bow of the invention will be brought down and submergence will occur. This can be continued to any desired depth by paying out line from the fishing reel. The invention may be maintained at any depth by keeping the line taut. The device may also be reeled in at any time against the force of the propeller.

I claim:

1. A self-propelled fishing device for towing and manipulating a fishing line and attached lures and hooks to various positions on and below the surface of a body of water comprising:
   a. a water tight, streamlined shell containing a rigidly mounted electric motor with an extended shaft and a battery held in place by frictional means and provided on its external surface with a number of extensions for carrying weights and fish hooks;
   b. a propeller positioned externally at one end of said shell with provision for a water tight coupling to the shaft inside the shell, said coupling serving to transmit rotary motion from the motor to the propeller;
   c. a control assembly attached to the outside of the shell and having an actuating lever equipped to receive one end of a fishing line:
   d. a spring-loaded cylindrical bar to which the actuating lever is rotatably attached, said cylindrical bar being provided with means for switching said motor on and off and means for imparting intermittent rotary motion to a rudder mechanism;
   e. a rudder mounted on the rudder mechanism with said mechanism in contact with said means for imparting intermittent rotary motion;
   f. diving planes moveably attached to the sides of said stream-lined hull;

whereby the fishing line can be attached to the actuating lever, the rudder and diving planes placed in neutral positions, baited hooks and weights attached, the device placed in the body of water and turned on by an initial tug of the fishing line and then maneuvered to a desired position by subsequent tugs.

2. A self-propelled fishing device as described in claim 1 in which said means for imparting intermittent rotary motion to the rudder mechanism is comprised of a threaded, linear-to-rotary motion converter which drives one half of a saw tooth clutch with the driven half of the clutch being attached to a rotatable spindle from which projects an eccentrically mounted drive rod.

3. A self-propelled fishing device utilizing a saw toothed clutch as described in claim 2 in which said eccentrically mounted drive rod is alternately engaged with two vanes which are rigidly mounted to the rudder so as to force the rudder to assume right, center and left position successively in response to tugs on the fishing line and to impart right turning, straight ahead travel and left turning to the fishing deice when it is being driven through the water by the propeller.

* * * * *